United States Patent
Knapp et al.

(10) Patent No.: US 10,400,721 B2
(45) Date of Patent: Sep. 3, 2019

(54) ADDITIONAL FUEL FILTRATION ON DEMAND

(71) Applicant: Caterpillar, Inc., Peoria, IL (US)

(72) Inventors: Norman David Knapp, Roanoke, IL (US); Sudhindra Ayanji, Edwards, IL (US)

(73) Assignee: Caterpillar Inc., Deerfield, IL (US)

(*) Notice: Subject to any disclaimer, the term of this patent is extended or adjusted under 35 U.S.C. 154(b) by 319 days.

(21) Appl. No.: 14/961,600

(22) Filed: Dec. 7, 2015

(65) Prior Publication Data
US 2017/0159623 A1 Jun. 8, 2017

(51) Int. Cl.
*F02M 37/22* (2019.01)
*F02M 37/00* (2006.01)
*B01D 35/00* (2006.01)
*B01D 29/56* (2006.01)
*B01D 37/04* (2006.01)
*B01D 29/60* (2006.01)

(52) U.S. Cl.
CPC .............. *F02M 37/22* (2013.01); *B01D 29/56* (2013.01); *B01D 29/601* (2013.01); *B01D 35/005* (2013.01); *B01D 37/041* (2013.01); *F02M 37/0023* (2013.01); *F02M 37/0052* (2013.01)

(58) Field of Classification Search
CPC .............. F02M 37/22; F02M 37/0052; F02M 37/0023; F02M 37/00–2037/228; B01D 35/005; B01D 29/56; B01D 37/041; B01D 29/601

See application file for complete search history.

(56) References Cited

U.S. PATENT DOCUMENTS

| | | | |
|---|---|---|---|
| 7,689,368 B2 | 3/2010 | Douglas | |
| 8,607,621 B2 | 12/2013 | Verdegan | |
| 2005/0103701 A1 | 5/2005 | Bechtum et al. | |
| 2011/0103901 A1 | 5/2011 | Hetcher et al. | |
| 2011/0232270 A1* | 9/2011 | Burkitt | F01N 3/0253 60/286 |
| 2013/0327729 A1* | 12/2013 | Apostolides | F17D 1/14 210/805 |
| 2016/0195053 A1* | 7/2016 | Shafer | F02M 63/0265 210/806 |
| 2017/0203241 A1* | 7/2017 | Subedi | B01D 35/147 |

* cited by examiner

*Primary Examiner* — David C Mellon
*Assistant Examiner* — Liam Royce
(74) *Attorney, Agent, or Firm* — Miller, Matthias & Hull

(57) ABSTRACT

A filtration system includes a particle counter configured to detect particles in a volume of fluid. The filtration system includes a control valve in fluid communication with the particle counter. The filtration system includes a controller in communication with the particle counter and the control valve. The controller may be configured to determine whether the detected particles exceed a predetermined threshold. The controller may be configured to command the control valve. The filtration system includes a filter in fluid communication with the control valve.

18 Claims, 3 Drawing Sheets

ADDITIONAL FUEL FILTRATION ON DEMAND

TECHNICAL FIELD

The present disclosure generally pertains to engine maintenance, and is directed toward an active filtration system.

BACKGROUND

Engine fuel containing debris may cause damage to various engine components during operation of the engine. The debris may wear the engine components and cause degradation of engine performance. Filtration systems may aid in reducing the amount debris in the engine fuel.

U.S. Pat. No. 8,607,621 to Verdegan discloses a system and method used to monitor fluid where it is important to know the size, concentration and nature of particulates in the fluid. The systems and method can be used to diagnose contamination issues in fluids such as fuel, lubrication, power transfer, heat exchange or other fluids in fluid systems. The systems and method can apply to diesel engines or hydraulic systems, where contaminant particles in the fluids are of concern.

The present disclosure is directed toward overcoming one or more of the problems discovered by the inventors or that is known in the art.

SUMMARY OF THE DISCLOSURE

In one embodiment, a filtration system for use in an engine fuel system is disclosed. The filtration system includes a particle counter configured to detect particles in a volume of fluid. The filtration system includes a control valve in fluid communication with the particle counter. The control valve may be configured to direct the output of the volume of fluid. The filtration system includes a controller in communication with the particle counter and the control valve. The controller may be configured to determine whether the amount of detected particles exceed a predetermined threshold. The controller may be configured to command the control valve. The filtration system includes a filter in fluid communication with the control valve.

In another embodiment, a method of filtering a fluid in an engine fuel system is disclosed. The method includes counting an amount of particles in the fluid. The method includes determining whether the amount of particles in a flow of the fluid exceeds a predetermined threshold. The method includes filtering the fluid when the amount of particles exceeds the predetermined threshold. The method includes recirculating the fluid after filtering the fluid. The method includes directing the fluid to a fuel injector when the amount of particles does not exceed the predetermined threshold.

In yet another embodiment, an active filtration system is disclosed. The active filtration system includes an upstream system. The upstream system includes a primary fuel filter and a particle counter in fluid communication with the secondary fuel filter. The particle counter may be configured to detect particles in a volume of fuel. The active filtration system includes a control valve in fluid communication with the upstream system. The control valve may be configured to direct the output of the volume of fuel. The active filtration system includes a controller in communication with the particle counter and the control valve. The active filtration system includes a second filter in fluid communication with the control valve, the third filter configured to remove at least a portion the particles from the volume of fuel.

DETAILED DESCRIPTION

This disclosure relates to a filtration system for use in an engine fuel system. The filtration system may include components to detect and clean contaminants from fuel before the fuel reaches a fuel injector of an engine. The filtration system may include a particle counter to detect and count the amount of contaminants in the fuel. A controller may receive the data from the particle counter and determine whether the fuel needs cleaning. The fuel may be cleaned by a filter in fluid communication with the particle counter. The process of detecting contaminants in the fuel and cleaning the fuel may be performed in a loop.

Figure 1:
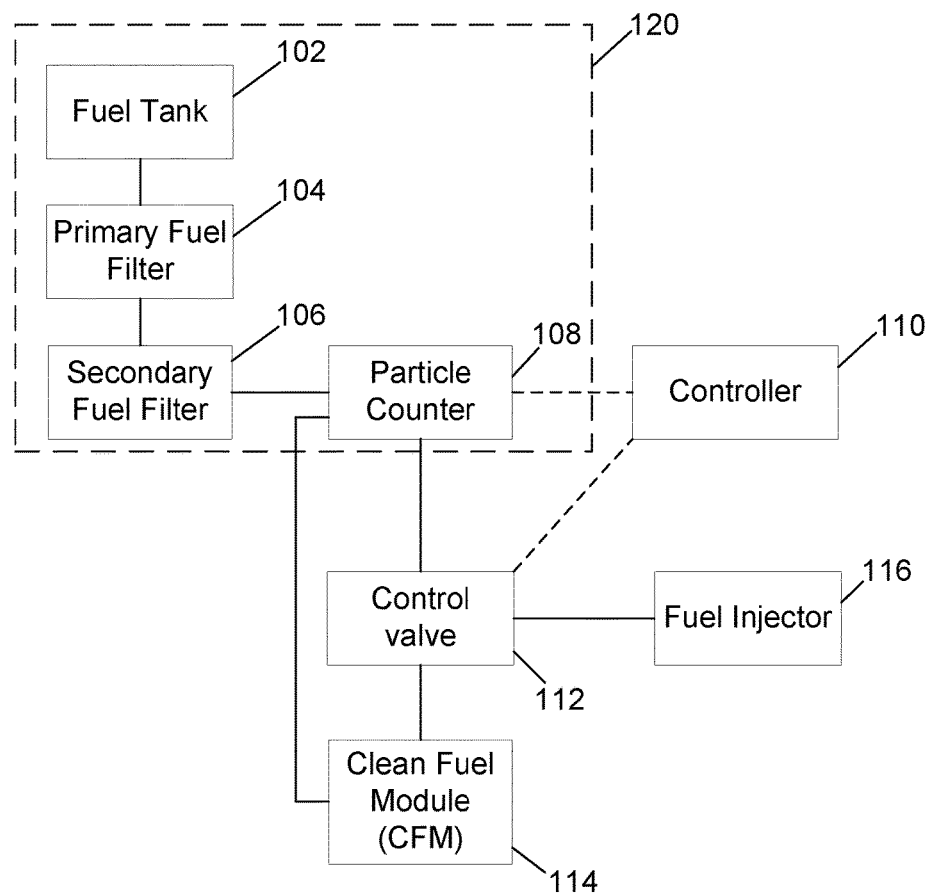
FIG. 1 is a schematic illustration of a filtration system according to an embodiment of the present disclosure.

FIG. 1 is a schematic illustration of a filtration system 100 according to an embodiment of the present disclosure. Filtration system 100 may include a fuel tank 102, a primary fuel filter 104, a secondary fuel filter 106, a particle counter 108, a controller (sometimes referred to as a filtration on demand module) 110, a control valve 112, a clean fuel module 114, and a fuel injector 116. Fuel tank 102 may be a reservoir in fluid communication with various components of filtration system 100. Fuel tank 102 may contain a fluid. The fluid may be a fuel, such as gasoline or diesel fuel. Fuel tank 102 may be in fluid communication with primary fuel filter 104. The fluid may flow downstream to primary fuel filter 104 through a fuel line pressurized by a fuel pump. Primary fuel filter 104 may be a filter that screens out contaminants such as debris particles. Primary fuel filter 104 may provide for an initial filtering of contaminants in the fluid.

In addition, primary fuel filter 104 may be in fluid communication with secondary fuel filter 106. The fluid may flow downstream from primary fuel filter 104 to secondary fuel filter 106. Similar to primary fuel filter 104, secondary fuel filter 106 may be a filter that screens out contaminants such as debris particles. Secondary fuel filter 106 may provide for a secondary filtering of contaminants. In some embodiments, secondary fuel filter 106 may filter out finer debris. In such embodiments, secondary fuel filter 106 may filter out debris less than 10 microns in size. Secondary fuel filter 106 may be in fluid communication with particle counter 108. The fluid may flow downstream from secondary fuel filter 106 to particle counter 108.

In some embodiments, filtration system 100 does not include primary fuel filter 104 and/or secondary fuel filter 106. In some embodiments, the fluid in fuel tank 102 may flow directly from fuel tank 102 to particle counter 108.

Particle counter 108 may determine the amount of particles in a volume of fluid. Particle counter 108 may determine the amount of particles in a flow of the fluid through particle counter 108. Particle counter 108 may be a device that can detect and/or count particles. In some embodiments, particle counter 108 may detect and/or count solid particles. In some embodiments, particle counter 108 may detect and/or count liquid particles. In such embodiments, particle counter 108 may detect and/or count water molecules. Particle counter 108 can employ at least one of a variety of techniques to detect particles within the fluid that flows from fuel tank 102. These techniques may include light blocking, light scattering, mesh blocking, the Coulter principle, direct imaging, and/or frequency noise detection. For example, the light blocking technique may detect larger particles by directing a light source, such as a laser, through a liquid and measuring the amount of light a particle blocks. For another example, the light scattering technique may detect smaller particles by focusing a light, such as a laser, through a liquid and measuring the reflected light as it passes through the liquid.

In some embodiments, fuel tank 102, primary fuel filter 104, secondary fuel filter 106, and particle counter 108 may define an upstream system 120 (sometimes referred to as a low pressure system). Upstream system 120 may include components of filtration system 100 upstream of control valve 112.

Particle counter 108 may be in fluid communication with control valve 112. The fluid may flow downstream from particle counter 108 to control valve 112. In some embodiments, control valve 112 is a three-way proportional valve. In such embodiments, control valve 112 receives the fluid via an inlet and may direct the fluid to one of two outlets. As shown in the figure, control valve 112 may direct the fluid to clean fuel module (CFM) 114 or to fuel injector 116.

CFM 114 may be a filter that screens out contaminants such as debris particle. In some embodiments, CFM 114 may include a plurality of filters connected in series. In some embodiments, CFM 114 includes a fuel transfer pump. In such embodiments, CFM 114 may filter at least some of the contaminants in the fluid and transfer the filtered fluid directly to another location. CFM 114 may transfer the fluid to upstream system 120. In particular, CFM 114 may transfer the fluid back to particle counter 108. In some embodiments, the fluid is looped from particle counter 108, to control valve 112, to CFM 114, and back to particle counter 108.

In some embodiments, CFM 114 may include a water separator. The water separator may filter water particles from a fluid. In some embodiments, the water separator is a separate device and is in fluid communication with CFM 114.

Fuel injector 116 may be a unit injector. In some embodiments, fuel injector 116 is an electronic unit injector (EUI), a mechanical unit injector (MUI), a hydraulically actuated electronic unit injector (HUEI), or a common rail injector. Fuel injector 116 may be used to deliver fuel in a fuel injection system. The fuel injection system can be used in internal combustion engines, such as gasoline engines, diesel engines, biodiesel engines, or hybrid engines.

In some embodiments, the fuel injection system includes a reservoir. The reservoir may be in fluid communication with fuel injector 116. The reservoir may contain clean fluid. The clean fluid may include contaminants less than a predetermined threshold. In some embodiments, the reservoir may store fluid that has been filtered by CFM 114. In some embodiments, the reservoir may store fluid that meets a certain ISO standard.

Controller 110 may be configured to receive data from various components of filtration system 100. For example, controller 110 may be configured to receive data from particle counter 108. Controller 110 may be configured to receive the amount of debris particles counted by particle counter 108. Furthermore, controller 110 may be configured to determine whether the amount of debris particles counted by particle counter 108 exceeds a predetermined threshold. The predetermined threshold may be a certain amount of debris particles within a volume of fluid that may cause damage to components of an engine. In some embodiments, the predetermined threshold is dependent on ISO (International Organization for Standardization) standards. In further embodiments, the predetermined threshold is dependent on the ISO standard selected by a fuel manufacturer. The predetermined threshold may vary across different jurisdictions, such as by country.

In addition, controller 110 may communicate with control valve 112. In some embodiments, controller 110 sends commands to control valve 112. Further, controller 110 may be configured to direct the output of the fluid of fuel tank 102 after control valve 112 receives the fluid. Controller 110 may be configured to direct the fluid to CFM 114 or to fuel injector 116. In some embodiments, controller 110 is configured to receive other data such as sensor measurements for temperature, pressure, flow rate, and other measurements. Controller 110 may also be configured to store fuel cleanliness data over time, in which the cleanliness data may indicate an unclean fuel supply. The fuel cleanliness data may include the amount of times the predetermined threshold of debris particles has been exceeded over a span of time. In some embodiments, controller 110 may be configured to analyze fuel cleanliness data to be used for fleet management, fuel manufacturer quality, or other data analytics.

Furthermore, controller 110 may be configured to determine whether filtration should be performed. Controller 110 may be configured to determine whether an expiration timer is reached during normal operation of an engine. In some embodiments, the expiration timer is an interval of time. The interval of time may be about 50 to 100 hours. In some embodiments, the expiration timer is a specific volume of fuel pumped through a filter, such as primary fuel filter 104, secondary fuel filter 106, CFM 114 or tertiary filter 214. If the expiration timer has been reached, controller 110 may command particle counter 108 to count the debris articles in the fuel. Controller 110 may determine whether the amount of debris particles counted exceeds a predetermined threshold. If the amount of debris particles counted exceeds the predetermined threshold, then controller 110 may command control valve 112 to transfer the fuel to CFM 114. In some embodiments, controller 110 commands a portion of the fuel to be transferred to CFM 114 and commands a portion of the fuel to be transferred to fuel injector 116. In other embodiments, controller 110 may command control valve 112 to transfer a reserve fuel from a reservoir to fuel injector 116. If the amount of debris particles counted does exceed the predetermined threshold, then controller 110 may allow or command control valve 112 to continue transferring fuel to fuel injector 116. Similarly, if the expiration timer has not been reached, controller 110 may allow or command control valve 112 to continue transferring fuel to fuel injector 116.

In one embodiment, particle counter 108 may detect debris particles in a volume of fluid and controller 110 counts the debris particles. Controller 110 may count the debris particles and compares the amount to a predetermined threshold.

Figure 2:
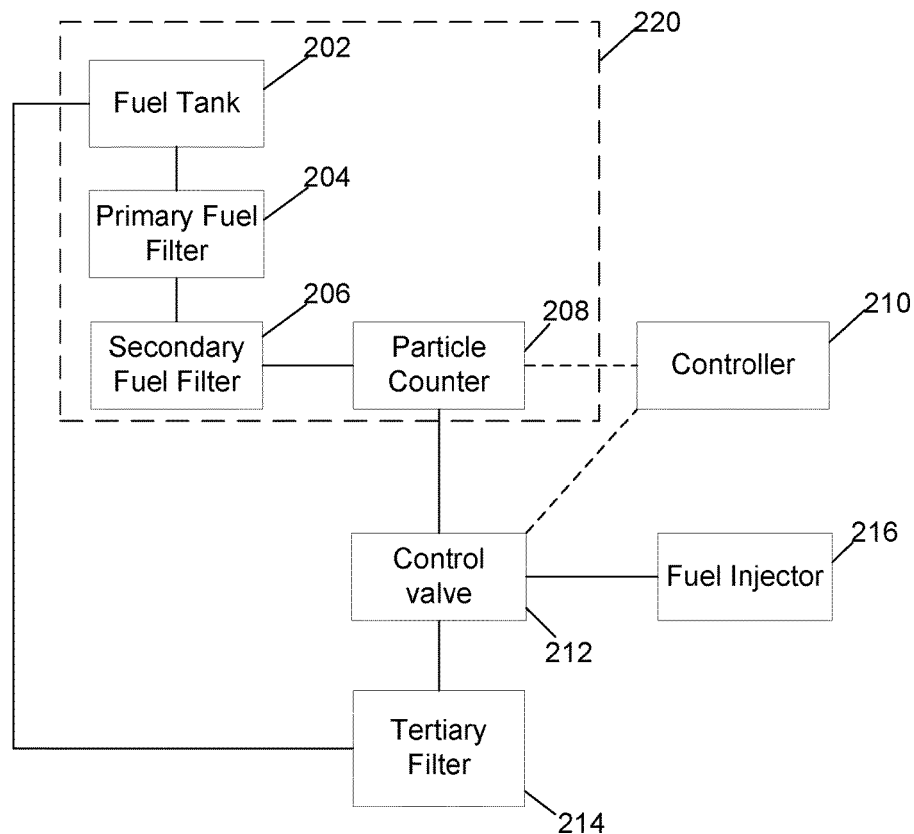
FIG. 2 is a schematic illustration of an alternative filtration system according to an embodiment of the present disclosure.

FIG. 2 is a schematic illustration of an alternative filtration system 200 according to an embodiment of the present disclosure. Filtration system 200 may include a fuel tank 202, a primary fuel filter 204, a secondary fuel filter 206, a particle counter 208, a controller 210, a control valve 212, a tertiary filter 214, and a fuel injector 216. Fuel tank 202, primary fuel filter 204, secondary fuel filter 206, particle counter 208, controller 210, control valve 212, and fuel injector 216 may be similar to fuel tank 102, primary fuel filter 104, secondary fuel filter 106, particle counter 108, controller 110, control valve 112, and fuel injector 116 of FIG. 1, respectively. Furthermore, similar to upstream system 120, fuel tank 202, primary fuel filter 204, secondary fuel filter 206, and particle counter 208 may define an upstream system 220.

Similar to filtration system 100 as described above, control valve 212 may direct the fluid of fuel tank 202 to tertiary filter 214 or to fuel injector 216. In some embodiments, control valve 212 is directed by controller 210. Tertiary filter 214 may be a filter that screens out contaminants such as debris particles. In some embodiments, the fluid of fuel tank 202 is filtered by tertiary filter 214 and transferred to upstream system 220. In particular, the fluid of fuel tank 202 is transferred back to fuel tank 202. In some embodiments, the fluid of fuel tank 202 is transferred by a fuel pump in communication with tertiary filter 214 and fuel tank 202. In further embodiments, the fluid is looped from fuel tank 202, to primary fuel filter 204, to secondary fuel filter 206, to particle counter 208, to control valve 212, to tertiary filter 214, and back to fuel tank 202. Upon looping back to fuel tank 202, the fluid of fuel tank 202 may be filtered again by primary fuel filter 204 and secondary fuel filter 206.

INDUSTRIAL APPLICABILITY

The present disclosure generally applies to a machine having a pressurized fluid system. Furthermore, the present disclosure is applicable to machines utilizing fuel which can contain contaminants such as debris. As the fuel travels through components of the machine, the contaminants may damage the components. Active filtration systems, such as filtration system 100, can remove the contaminants before the contaminated fuel damages the components. Filtration system 100 can also prolong the lifespan of the filters utilized in the system. Filtration system 100 can detect and count the amount of contaminants in the fuel. In addition, filtration system 100 can command for removal of the contaminants when the amount of contaminants in the fuel exceeds a predetermined threshold. Filtration system 100 can be used for a variety of fuel injection systems. For example, filtration system 100 can be used for an electronic unit injection system, a mechanical unit injection system, a hydraulic electronic unit injection system, or a common rail injection system. Furthermore, filtration system 100 can be used in machines such as trucks, excavators, loaders, pavers, compactors, dozers, draglines, or other heavy machinery equipment. Certain components of filtration system 100, such as particle counter 108 and controller 110, may be retrofitted to existing filtration systems.

Figure 3:
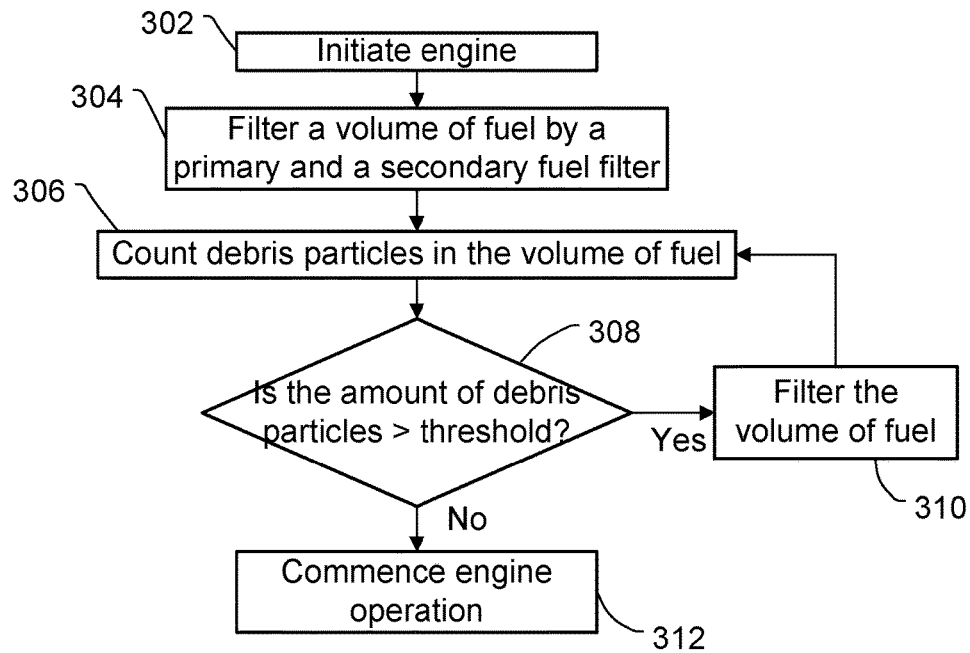
FIG. 3 is a flow chart illustrating an exemplary method of filtering fuel for contaminants during a startup process of an engine according to an embodiment of the present disclosure.

FIG. 3 is a flow chart illustrating an exemplary method of filtering fuel for contaminants during a startup process of an engine according to an embodiment of the present disclosure. At a step 302, an engine may be initiated. In some embodiments, the engine is a diesel engine. During initiation, fuel may not be combusted for a brief period of time. This may protect the combustion chamber and/or fuel injector from contaminated fuel. In some embodiments, the initiation of the engine lasts for at least one second. In some embodiments, the initiation of the engine lasts for at least two seconds. In some embodiments, the initiation of the engine lasts for at least 15 seconds. During the initiation process, an operator may be notified that the engine fuel is being checked for contaminants.

At a step 304, a volume of fuel may be filtered by at least one filter. In some embodiments, the volume of fuel may be filtered by two filters, such as primary fuel filter 104 and secondary fuel filter 106 of FIG. 1. The at least one filter may screen and remove contaminants from the volume of fuel. The volume of fuel may be a sufficient volume to test for contaminants. In some embodiments, the volume of fuel is an initial volume of fuel pumped from a fuel tank, such as fuel tank 102 or 202, during the initiation of an engine, such as in step 302. In such embodiments, a fuel limiter is used to limit the amount of fuel pumped through the fuel line during initiation of the engine. After filtering, the volume of fuel may be transferred to a particle counter.

In some embodiments, step 304 is not performed. In such embodiments, the volume of fuel may flow from fuel tank 102 or 202 directly to another component, such as particle counter 108 of FIG. 1 or 208 of FIG. 2.

At a step 306, an amount of debris particles may be counted in a volume of fuel. The volume of fuel may be the volume of fuel filtered by the last one filter in step 304. The amount of debris particles may be counted by a particle counter, such as particle counter 108 or particle counter 208. The particle counter may detect and count solid and/or liquid contaminants. The particle counter may employ at least one of a variety of techniques including light blocking, light scattering, mesh blocking, the Coulter principle, direct imaging, and/or frequency noise detection.

At a step 308, an amount of debris particles counted may be compared to a predetermined threshold. The amount of debris particles may be counted by a particle counter such as particle counter 108 or particle counter 208 in step 306. The comparison may be performed by a controller, such as controller 110 of FIG. 1 or controller 210 of FIG. 2. If the amount debris particles counted by the particle counter is greater than the predetermined threshold, a step 310 may be performed. On the other hand, if the amount debris particles counted by the particle counter is equal or less than the predetermined threshold, a step 312 may be performed.

In some embodiments, the controller may indicate to an operator the amount of debris particles counted in the volume of fuel, regardless whether the amount of debris particles exceeded the predetermined threshold.

At step 310, a volume of fuel may be filtered. In some embodiments, the volume of fuel is the volume of fuel in step 308. In some embodiments, the volume of fuel has been filtered at least once. In other embodiments, the volume of fuel has been filtered at least twice. Furthermore, the volume of fuel may be filtered by clean fuel module (CFM) 114 of FIG. 1 or by tertiary filter 214 of FIG. 2. CFM 114 and tertiary filter 214 may screen and remove the debris particles from the volume of fuel. CFM 114 and tertiary filter 214 may be designed to be active filters. Furthermore, CFM 114 and tertiary filter 214 may be designed to remove a significant amount of contaminants from the volume of fuel. As such, the lifetime of other filters, such as primary fuel filter 104, primary fuel filter 204, secondary fuel filter 106, and secondary fuel filter 206 may be prolonged.

In some embodiments, after the volume of fuel is filtered by CFM 114 or tertiary filter 214, step 306 is performed again. In such embodiments, the volume of fuel is transferred back to particle counter 108 or particle counter 208.

In other embodiments, the volume of fuel is transferred to a reservoir in fluid communication with fuel injector 116. The reservoir may provide storage for the filtered volume of fuel. By removing the debris particles in the volume of fuel, the fuel delivered to the engine may be safe from an excessive amount of contaminants. This may ensure that only clean fuel is delivered to the engine during startup of the engine. Furthermore, this may ensure the at least one filter in step 304 is working properly.

At step 312, the engine may commence normal operation. In some embodiments, this may include commencing the combustion process of the fuel in a combustion chamber of the engine. Combusting the fuel may include transferring the volume of fuel to a fuel injector, such as fuel injector 116 or 216. The volume of fuel may have been verified for cleanliness at steps 306 and 308. As such, the volume of fuel may be safe to be transferred to the fuel injector. In some embodiments, an operator may be notified that the volume of fuel from steps 302-312 has been verified as clean. In such embodiments, the operator may be notified that operation of a machine, such as a truck, can be commenced. In some embodiments, commencement of the operation of the machine may include pumping additional fluid from a fuel tank, such as fuel tank 102 or 202.

In some embodiments, fuel that is transferred to the fuel injector is not used by the fuel injector. The unused fuel may be returned back to the fuel tank. The unused fuel may be recirculated through a filtration system, such as filtration system 100 or 200. In some embodiments, the unused fuel starts the filtration process at step 304. In some embodiments, the unused fuel starts the filtration process at step 306.

Figure 4:
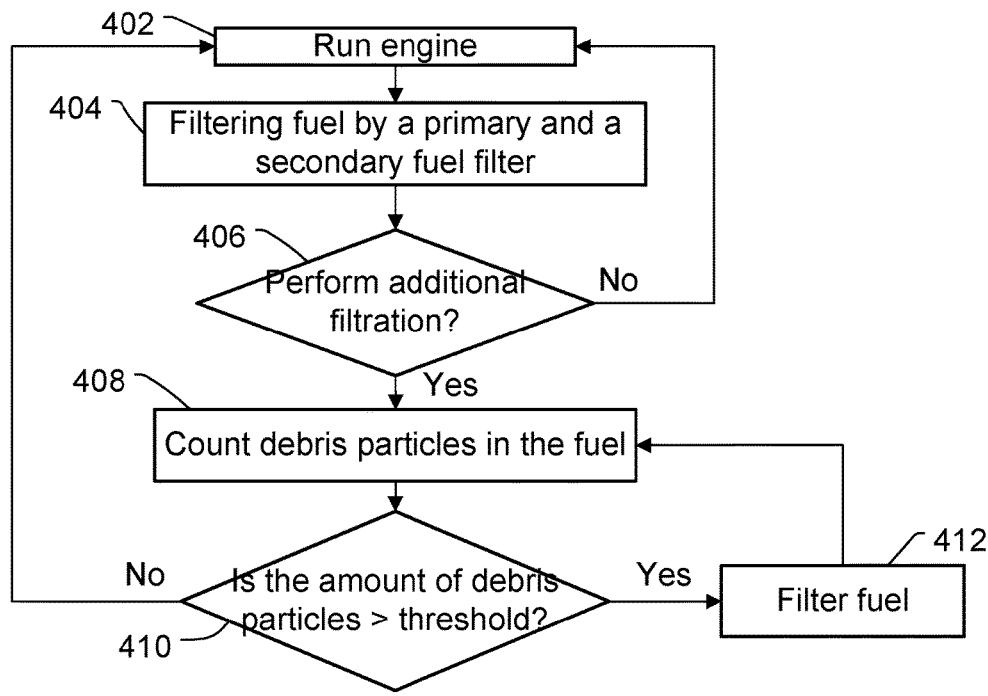
FIG. 4 is a flow chart illustrating an exemplary method of filtering fuel for contaminants during normal operation of an engine according to an embodiment of the present disclosure.

FIG. 4 is a flow chart illustrating an exemplary method of filtering fuel for contaminants during normal operation of an engine according to an embodiment of the present disclosure. At a step 402, an engine may be running under normal operation. The engine may include a filtration system such as filtration system 100. The engine may be a gasoline or a diesel engine.

At a step 404, fuel may be filtered by a primary and a secondary fuel filter. These filters may be primary fuel filter 104 or 204 and secondary fuel filter 106 or 206. These filters may provide an initial filtering of the fuel during normal operation of an engine, such as at step 402. In some embodiments, step 404 is not performed.

At a step 406, a filtration check may be performed. In some embodiments, the filtration check is for an additional filtration after an initial filtration, such as at step 404. The filtration check may include whether an expiration timer has been reached. In some embodiments, the expiration timer is an interval of time. In some embodiments, the expiration timer is a specific volume of fuel pumped through a filter. If the expiration timer has been reached, a step 408 may be performed. If the expiration timer has not been reached, then step 402 may be performed again.

At step 408, debris particles may be counted in the fuel. This step may be similar to step 306 explained above. After the debris particles are counted, a step 410 may be performed.

At step 410, an amount of debris particles counted may be compared to a predetermined threshold. This step may be similar to step 308 explained above. If the amount debris particles counted is greater than the predetermined threshold, a step 412 may be performed. If the amount debris particles counted is equal or less than the predetermined threshold, then step 402 may be performed again.

At step 412, the fuel may be filtered. Step 412 may be similar to step 310 as explained above. In some embodiments, a portion of the fuel may be filtered and a portion of the fuel may be transferred to a fuel injector during the filtration process. In other embodiments, a reserve fuel may be supplied to the fuel injector during the filtering process. In such embodiments, a reservoir in fluid communication with the fuel injector may supply the fuel injector with reserve fuel while the fuel from step 410 is being filtered. In both embodiments, unclean fuel transferred to the fuel injector may be minimized. After filtering the fuel, step 408 may be performed again.

The various illustrative logical blocks and steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, controller 110, and controller 210 described herein may be implemented in hardware, software, firmware, or any combination thereof. Any features described as components or blocks may be implemented together in an integrated logic device or separately as discrete but interconnected logic devices. If implemented in software, the methods may be realized at least in part by a computer-readable non-volatile data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The methods additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the methods described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the methods described herein.

Those of skill will appreciate that the various illustrative blocks described in connection with the embodiment disclosed herein can be implemented in various forms. Some blocks have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the disclosure. In addition, the grouping of functions within a block or step is for ease of description. Specific functions or steps can be moved from one block or distributed across to blocks without departing from the disclosure.

The above description of the disclosed embodiment is provided to enable any person skilled in the art to make or use the subject matter of the disclosure. Various modifications to these embodiments will be readily apparent to those skilled in the art, and the generic principles described herein can be applied to other embodiment without departing from the spirit or scope of the disclosure. Thus, it is to be understood that the description and drawings presented herein represent a presently preferred implementation of the disclosure and are therefore representative of the subject matter which is broadly contemplated by the present disclosure. It is further understood that the scope of the present disclosure fully encompasses other embodiment that may become obvious to those skilled in the art and that the scope of the present disclosure is accordingly limited by nothing other than the appended claims.

All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A filtration system for use in an engine fuel system, the filtration system comprising:
    a particle counter configured to detect particles in a volume of fluid;
    a control valve in fluid communication with the particle counter, the control valve being downstream of the particle counter and configured to selectively direct the output of the volume of fluid to one of a first flow path that leads to a fuel injector and a second flow path that leads directly to at least one filter, the first flow path and the second flow path being distinct and mutually exclusive;
    the fuel injector, which is downstream of the control valve;
    the at least one filter, which is downstream of the control valve, and has an output in direct fluid communication with an input of the particle counter; and
    a controller in communication with the particle counter and the control valve, the controller being configured to:
        determine whether the detected particles exceed a predetermined threshold, and
        command the control valve to:
            direct the volume of fluid to the fuel injector when the detected particles do not exceed the predetermined threshold, and
            direct the volume of fluid to the particle counter via the at least one filter when the detected particles exceed the predetermined threshold.

2. The filtration system of claim 1, wherein the at least one filter removes at least a portion of the particles from the volume of fluid.

3. The filtration system of claim 2, wherein the filtered volume of fluid is recirculated in the filtration system via the control valve.

4. The filtration system of claim 3, wherein the volume of fluid is recirculated to the particle counter via the at least one filter.

5. The filtration system of claim 3, further comprising a fuel tank, wherein the control valve is further configured to recirculate the volume of fluid via the at least one filter to the fuel tank.

6. The filtration system of claim 1, wherein the volume of fluid is an initial volume of fuel pumped from a fuel tank during initiation of an engine.

7. The filtration system of claim 1 further comprising a fuel tank in fluid communication with the particle counter via a primary fuel filter, the primary fuel filter being different from the at least one filter.

8. The filtration system of claim 4, wherein the at least one filter comprises a clean fuel module, the clean fuel module having a pump in fluid communication with one or more filters in fluid communication with the particle counter.

9. The filtration system of claim 1, wherein the controller is configured to command the control valve to stop all flow of the volume of fluid to the fuel injector when the detected particles exceed the predetermined threshold.

10. The filtration system of claim 1, further comprising a fuel tank upstream of the particle counter and the control valve, wherein the controller is configured to command the control valve to direct the volume of fluid to the particle counter, via the at least one filter and without going through the fuel tank, when the detected particles exceed the predetermined threshold.

11. A filtration system for use in an engine fuel system, the filtration system comprising:
    a particle counter configured to detect particles in a volume of fluid;
    a control valve in fluid communication with the particle counter, the control valve being downstream of the particle counter and configured to selectively direct the output of the volume of fluid to one of a first flow path that leads to a fuel injector and a second flow path that leads directly to at least one filter, the first flow path and the second flow path being distinct and mutually exclusive;
    the fuel injector, which is downstream of the control valve;

the at least one filter, which is downstream of the control valve, and has an output in direct fluid communication with an input of the particle counter;

a fuel tank upstream of the particle counter and the control valve; and a controller in communication with the particle counter and the control valve, the controller being configured to:

determine whether the detected particles exceed a predetermined threshold, and command the control valve to:

direct the volume of fluid to the fuel injector when the detected particles do not exceed the predetermined threshold, direct the volume of fluid to the particle counter via the at least one filter and without going through the fuel tank when the detected particles exceed the predetermined threshold, and stop all flow of the volume of fluid to the fuel injector when the detected particles exceed the predetermined threshold.

12. The filtration system of claim 11, wherein the at least one filter removes at least a portion of the particles from the volume of fluid.

13. The filtration system of claim 12, wherein the filtered volume of fluid is recirculated in the filtration system via the control valve.

14. The filtration system of claim 13, wherein the volume of fluid is recirculated to the particle counter via the at least one filter.

15. The filtration system of claim 11, wherein the volume of fluid is an initial volume of fuel pumped from a fuel tank during initiation of an engine.

16. The filtration system of claim 11 further comprising a primary fuel filter, the primary fuel filter being different from the at least one filter.

17. The filtration system of claim 1, wherein the controller is configured to command the control valve to direct the volume of fluid to the particle counter, via the at least one filter, without providing the volume of fluid to a primary fuel filter or a secondary fuel filter upstream of the particle counter.

18. The filtration system of claim 1, wherein the controller is configured to command the control valve to continue flow of a portion of the volume of fluid to the fuel injector when the detected particles exceed the predetermined threshold.

* * * * *